(12) United States Patent
Fuller et al.

(10) Patent No.: US 8,997,536 B2
(45) Date of Patent: Apr. 7, 2015

(54) LOCKOUT DEVICE

(71) Applicant: Master Lock Company LLC, Oak Creek, WI (US)

(72) Inventors: Robert S. Fuller, West Bend, WI (US); John Whealon, West Bend, WI (US)

(73) Assignee: Master Lock Company LLC, Oak Creek, WI (US)

( * ) Notice: Subject to any disclaimer, the term of this patent is extended or adjusted under 35 U.S.C. 154(b) by 148 days.

(21) Appl. No.: 13/792,973

(22) Filed: Mar. 11, 2013

(65) Prior Publication Data

US 2014/0060128 A1 Mar. 6, 2014

Related U.S. Application Data

(60) Provisional application No. 61/694,808, filed on Aug. 30, 2012.

(51) Int. Cl.
*F16K 35/00* (2006.01)
*E05B 13/00* (2006.01)
*F16K 35/10* (2006.01)

(52) U.S. Cl.
CPC ............... *E05B 13/002* (2013.01); *F16K 35/10* (2013.01)

(58) Field of Classification Search
USPC ........... 70/175–180, 201–203, 210–212, 233; 137/385; 251/101
See application file for complete search history.

(56) References Cited

U.S. PATENT DOCUMENTS

| | | | |
|---|---|---|---|
| 380,961 A | 4/1888 | Waine | |
| 507,948 A | 10/1892 | Waine | |
| 539,650 A | 5/1895 | Searle | |
| 558,814 A | 4/1896 | Hunt | |
| 677,907 A * | 7/1901 | Vandeleur | 70/233 |
| 1,098,954 A * | 6/1914 | Meyer | 70/195 |

(Continued)

FOREIGN PATENT DOCUMENTS

| | | |
|---|---|---|
| CA | 1171294 | 7/1984 |
| CA | 2190575 | 11/1995 |

(Continued)

OTHER PUBLICATIONS

International Search Report and Written Opinion from International Application No. PCT/US13/56113, date of mailing Jan. 9, 2014.

(Continued)

*Primary Examiner* — Suzanne Barrett
(74) *Attorney, Agent, or Firm* — Calfee, Halter & Griswold LLP

(57) ABSTRACT

A lockout device for a handle assembly includes first and second lockout members each including an outward facing base wall and outward extending first and second projections. The first and second projections of the first base member are spaced apart to receive the handle therebetween, and the first and second projections of the second base member are spaced apart to receive the handle latch therebetween. The first and second lockout members are pivotable with respect to each other to a lockout position for engagement of the base walls of the first and second lockout members with facing surfaces of a handle and a handle latch of the handle assembly. When the first and second lockout members are secured between the handle and the handle latch in the lockout position, the first and second lockout members block movement of the handle latch to prevent rotational movement of the handle assembly.

18 Claims, 9 Drawing Sheets

(56) References Cited

U.S. PATENT DOCUMENTS

| | | | |
|---|---|---|---|
| 1,161,562 A | | 11/1915 | Wesson |
| 1,197,020 A | * | 9/1916 | Farrar ............... 70/203 |
| 1,245,770 A | | 11/1917 | Rideout |
| 1,266,391 A | * | 5/1918 | Bonney ............... 70/195 |
| 1,348,666 A | | 8/1920 | Schuler |
| 1,358,184 A | | 11/1920 | Voight |
| 1,380,719 A | | 6/1921 | Johnson |
| 1,384,561 A | | 7/1921 | Hampton |
| 1,394,259 A | | 10/1921 | Johnson |
| 1,475,256 A | | 11/1923 | Belair |
| 1,531,451 A | | 3/1925 | Neal |
| 1,539,301 A | | 5/1925 | Cooper |
| 1,566,965 A | | 12/1925 | Johnson |
| 1,660,040 A | | 2/1928 | Lehtonen |
| 1,686,482 A | * | 10/1928 | Windle ............... 42/70.07 |
| 1,851,207 A | | 3/1932 | Neal |
| 1,855,686 A | | 4/1932 | Neal |
| 1,900,242 A | | 3/1933 | Latou |
| 2,190,661 A | | 2/1940 | Hauer |
| 2,390,885 A | | 12/1945 | Kelley |
| 2,505,227 A | * | 4/1950 | Charters ............... 42/70.06 |
| 2,570,662 A | | 10/1951 | Gray |
| 2,759,349 A | | 8/1956 | McKee |
| 3,435,642 A | | 4/1969 | Del Pesco |
| 3,821,884 A | | 7/1974 | Walsh |
| 3,841,118 A | | 10/1974 | Stone |
| 3,907,255 A | | 9/1975 | McElroy |
| 4,180,996 A | | 1/1980 | Lebrecht |
| 4,287,731 A | | 9/1981 | Kruger |
| 4,398,366 A | | 8/1983 | Wernicki |
| 4,426,861 A | * | 1/1984 | Chillis ............... 70/39 |
| 4,479,320 A | | 10/1984 | Fix |
| 4,509,346 A | | 4/1985 | Szczepanek |
| 4,512,099 A | | 4/1985 | Mathew |
| 4,574,600 A | | 3/1986 | Moffett |
| 4,639,978 A | | 2/1987 | Boden |
| 4,850,207 A | | 7/1989 | Yiven |
| 4,878,270 A | | 11/1989 | Westerkamp |
| 4,999,940 A | | 3/1991 | Madden |
| 5,003,797 A | * | 4/1991 | Wirth et al. ............... 70/180 |
| 5,070,712 A | | 12/1991 | Fox |
| 5,165,263 A | * | 11/1992 | Perron et al. ............... 70/177 |
| 5,222,382 A | * | 6/1993 | De Vizzi ............... 70/212 |
| 5,289,653 A | | 3/1994 | Szebeni et al. |
| 5,347,835 A | * | 9/1994 | Dewey ............... 70/202 |
| 5,473,917 A | | 12/1995 | Say |
| 5,475,994 A | | 12/1995 | Briley et al. |
| 5,491,918 A | | 2/1996 | Elmstedt |
| 5,511,399 A | * | 4/1996 | Lynn ............... 70/19 |
| 5,517,835 A | | 5/1996 | Smith |
| 5,598,724 A | | 2/1997 | Primeau |
| 5,660,064 A | | 8/1997 | Ecker et al. |
| 5,664,358 A | | 9/1997 | Haber et al. |
| 5,732,498 A | | 3/1998 | Arreguin |
| 5,743,117 A | | 4/1998 | Woo et al. |
| 5,791,170 A | | 8/1998 | Officer |
| 5,806,555 A | | 9/1998 | Magno |
| 5,881,582 A | | 3/1999 | Monaco |
| 5,987,946 A | | 11/1999 | Watts |
| 6,003,348 A | | 12/1999 | McCrea |
| 6,212,919 B1 | | 4/2001 | Gerow |
| 6,308,540 B1 | * | 10/2001 | Lee ............... 70/58 |
| 6,311,422 B1 | | 11/2001 | Exum et al. |
| 6,382,002 B1 | | 5/2002 | Chen |
| 6,393,750 B1 | | 5/2002 | Rossini et al. |
| D462,735 S | * | 9/2002 | Rohde et al. ............... D22/108 |
| 6,543,171 B2 | | 4/2003 | Kellerman |
| 6,560,910 B1 | | 5/2003 | McLaren |
| 6,622,536 B1 | * | 9/2003 | Fuller et al. ............... 70/177 |
| 6,629,440 B1 | | 10/2003 | Meekma et al. |
| 6,755,054 B2 | | 6/2004 | Burmesch et al. |
| 6,959,909 B2 | | 11/2005 | Bancroft et al. |
| 7,044,148 B2 | * | 5/2006 | Berger et al. ............... 137/15.08 |
| 7,581,420 B2 | * | 9/2009 | Manthe et al. ............... 70/178 |
| 7,845,367 B2 | * | 12/2010 | Abe ............... 137/385 |
| 7,870,767 B2 | * | 1/2011 | Brojanac et al. ............... 70/178 |
| 8,061,683 B2 | | 11/2011 | Long |
| 8,347,671 B2 | * | 1/2013 | Brojanac et al. ............... 70/178 |
| 8,720,479 B2 | * | 5/2014 | Reinert ............... 137/385 |
| 2003/0066320 A1 | * | 4/2003 | Vito ............... 70/233 |
| 2003/0154751 A1 | * | 8/2003 | Turek ............... 70/203 |
| 2003/0164011 A1 | * | 9/2003 | Fuller et al. ............... 70/177 |
| 2004/0226611 A1 | * | 11/2004 | Berger et al. ............... 137/385 |
| 2007/0240766 A1 | | 10/2007 | Brojanac et al. |
| 2010/0175786 A1 | * | 7/2010 | Martin ............... 141/392 |
| 2010/0206022 A1 | * | 8/2010 | Katz et al. ............... 70/233 |
| 2014/0034153 A1 | * | 2/2014 | Grade et al. ............... 137/385 |

FOREIGN PATENT DOCUMENTS

| | | |
|---|---|---|
| EP | 0 893 562 | 1/1999 |
| GB | 410205 A | 5/1934 |
| GB | 178900 A | 4/1992 |
| WO | WO 02/20926 | 3/2002 |

OTHER PUBLICATIONS

Valve Lockouts, Total Lockout (Safety) Ltd. May 2011 [retrieved on Dec. 16, 2013]. Retrieved from the Internet:<URL:http://www.total-lockout.com/WebRoot/BT3/Shops/BT4166/MediaGallery/Documents/Catalogues/Valve_Lockout_Supplement_2001_2012_Catalogue.pdg>pg46.

Panduit PSL-BFV; web catalog disclosure; http://www.panduit.com/Products/ProductOverviews/ProductSearch/index.htm?Ns=P__ItemSortOrder&Ne=1&R=PSL-BFV&sid=13952D62A107&lastNodeId=ss_prod_locktagoutsafetynetsec&N=5000001%20396%203001024; 1 page; 2013.

Brady—Butterfly Valve Lockout—Large—#121505; web catalog disclosure; http://www.bradyid.com/bradyid/pdpv/121505.html; 1 page; 2013.

North by Honeywell—B-Safe Vall Valve Lockout; web catalog disclosure; http://northsafety.com/TriggerWorkflow.aspx?WorkflowModuleGUID=a3c3bf34-f500-45aa-a73f-13a246669a21&Alias=NSUS&SB__ContentItemGuid=b55fb755-d4a7-40dc-8e76-f21a2d582782&KeepSession=True&Tags:PC%20Tags:PC__ItemGuid=fb68a25b-84d9-46b3-b066-4d7918a54c76; 1 page; 2013.

\* cited by examiner

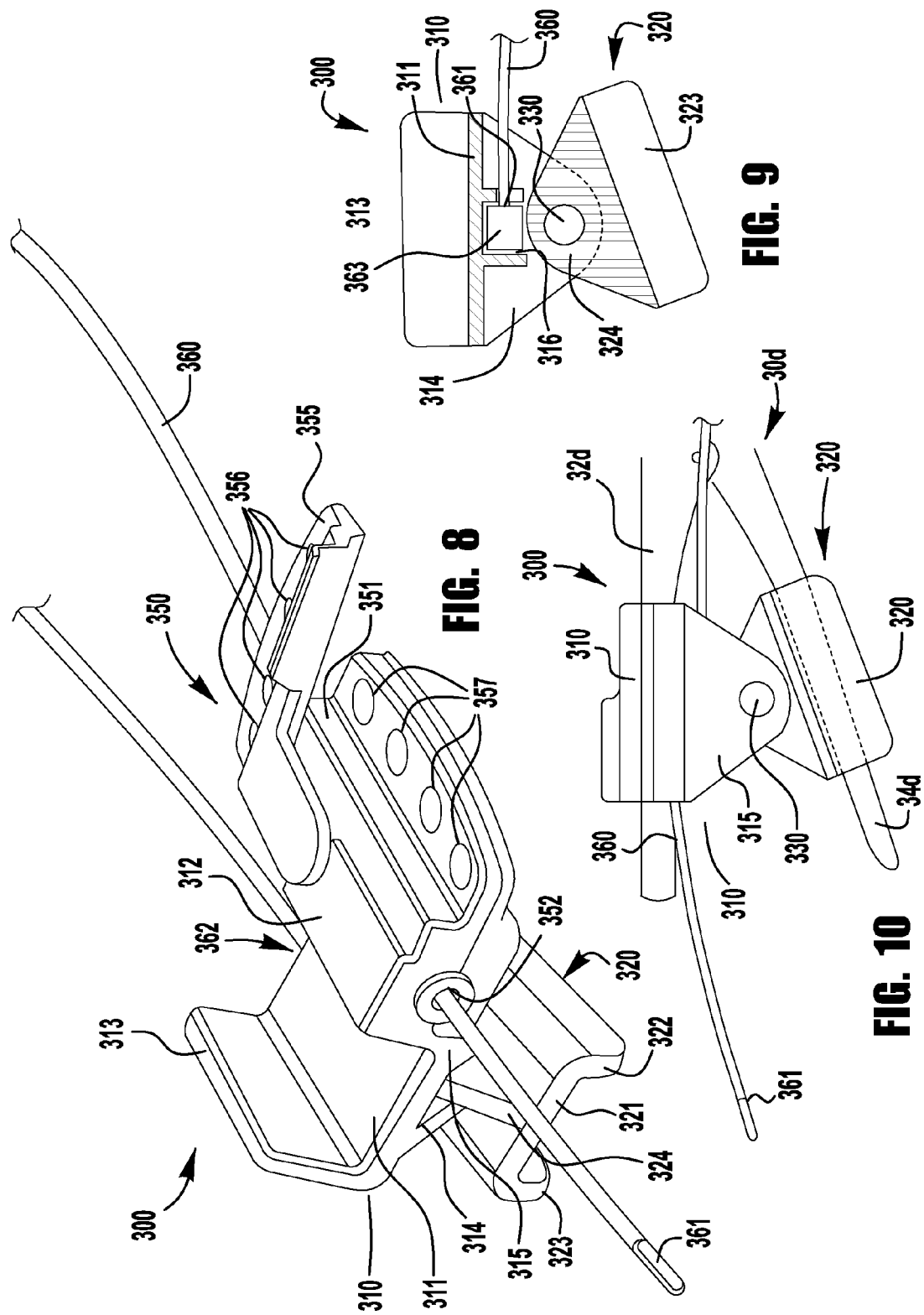

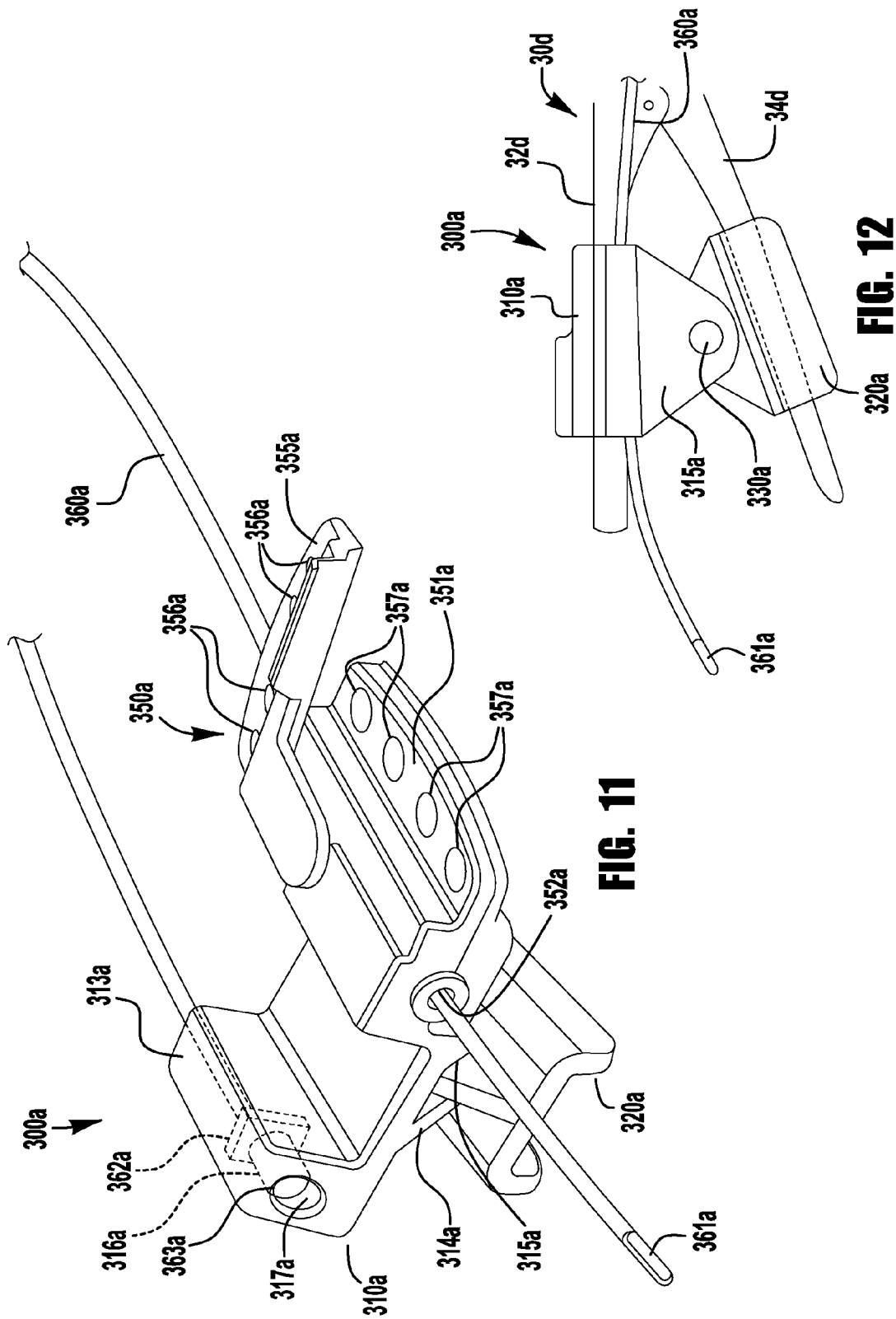

LOCKOUT DEVICE

CROSS-REFERENCE TO RELATED APPLICATION

This application claims priority to and the benefit of U.S. Provisional Patent Application Ser. No. 61/694,808, entitled "LOCKOUT DEVICE" and filed Aug. 30, 2012, the entire disclosure of which is incorporated herein by reference.

BACKGROUND

Many security devices are provided for restricting access to equipment and control instruments, including, for example, electrical components, such as switches, dials and push buttons, and fluid system components, such as valves and pressure regulators. One such security device is a valve lockout device configured to prevent the operation of a valve. The valve lockout device may be utilized during maintenance of the associated fluid system or under other conditions in which the flow setting of the valve must not be changed.

SUMMARY

According to an exemplary embodiment of the present application, a lockout device for a handle assembly includes first and second lockout members each including an outward facing base wall and outward extending first and second projections. The first and second projections of the first base member are spaced apart to receive the handle therebetween, and the first and second projections of the second base member are spaced apart to receive the handle latch therebetween. The first and second lockout members are pivotable with respect to each other to a lockout position for engagement of the base walls of the first and second lockout members with facing surfaces of a handle and a handle latch of the handle assembly. When the first and second lockout members are secured between the handle and the handle latch in the lockout position, the first and second lockout members block movement of the handle latch to prevent rotational movement of the handle assembly.

Another exemplary embodiment of the present application involves a method of securing a handle assembly in a latched condition, with the handle assembly including a handle and a handle latch assembled with the handle and movable toward the handle to release the handle assembly for rotational movement. In the exemplary method, a lockout body is inserted between opposed facing surfaces of the handle and the handle latch, such that the facing surface of the handle is received between first and second projections of the lockout body to engage a first surface of the lockout body, and the facing surface of the handle latch is received between third and fourth projections of the lockout body to engage a second surface of the lockout body. The first, second, third, and fourth projections prevent lateral disengagement of the lockout body from the handle assembly. A cinching member is secured to the lockout body. The cinching member is tightened around the handle assembly to prevent longitudinal disengagement of the lockout body from the handle assembly.

According to another exemplary embodiment of the present application, an instrument having a latching handle assembly including a handle and a handle latch is provided in combination with a lockout device securing the handle latch in a handle latching position. The lockout device includes a lockout body and a cinching member. The lockout body is inserted between opposed facing surfaces of the handle and the handle latch, such that the facing surface of the handle is received between first and second projections of the lockout body and in engagement with a first surface of the lockout body, and the facing surface of the handle latch is received between third and fourth projections of the lockout body and in engagement with a second surface of the lockout body. The first, second, third, and fourth projections prevent lateral disengagement of the lockout body from the handle assembly. The cinching member is secured to the lockout body and is tightened around the handle assembly to prevent longitudinal disengagement of the lockout body from the handle assembly.

BRIEF DESCRIPTION OF THE DRAWINGS

Further features and advantages of the invention will become apparent from the following detailed description made with reference to the accompanying drawings, wherein:

FIG. 8 is a perspective view of another handle lockout device;

FIG. 9 is a partial cross-sectional side view of the lockout device of FIG. 8;

FIG. 10 is a side view of the lockout device of FIG. 8, shown assembled with an exemplary handle assembly;

FIG. 11 is a perspective view of another handle lockout device; and

FIG. 12 is a side view of the lockout device of FIG. 11, shown assembled with an exemplary handle assembly.

DETAILED DESCRIPTION

This Detailed Description merely describes exemplary embodiments and is not intended to limit the scope of the claims in any way. Indeed, the invention as claimed is broader than and unlimited by the exemplary embodiments, and the terms used in the claims have their full ordinary meaning. For example, while the specific embodiments described herein relate to a lockout device for a assembly having a pivotable handle latch, for example, as used with butterfly valves, inventive aspects of the exemplary embodiments of the present application may additionally or alternatively be applied to other types of lockout devices and/or for use with other types of equipment (e.g., other handle, switch, and button lockout devices).

The present application contemplates a lockout device for use with a valve or other component including a manually releasable handle. While many different types of handle configurations may be contemplated, in an exemplary embodiment, a system component, such as a butterfly valve, may utilize a rotationally operable handle (e.g., a lever handle or knob handle) that is secured in a selected rotational position when a handle latch is in a normal or locked condition. When the handle latch is squeezed, pivoted, slid, screwed, toggled or otherwise moved into the actuated or release condition, the handle is rotatable out of the selected rotational position, for example to a different rotational position.

Figure 1:
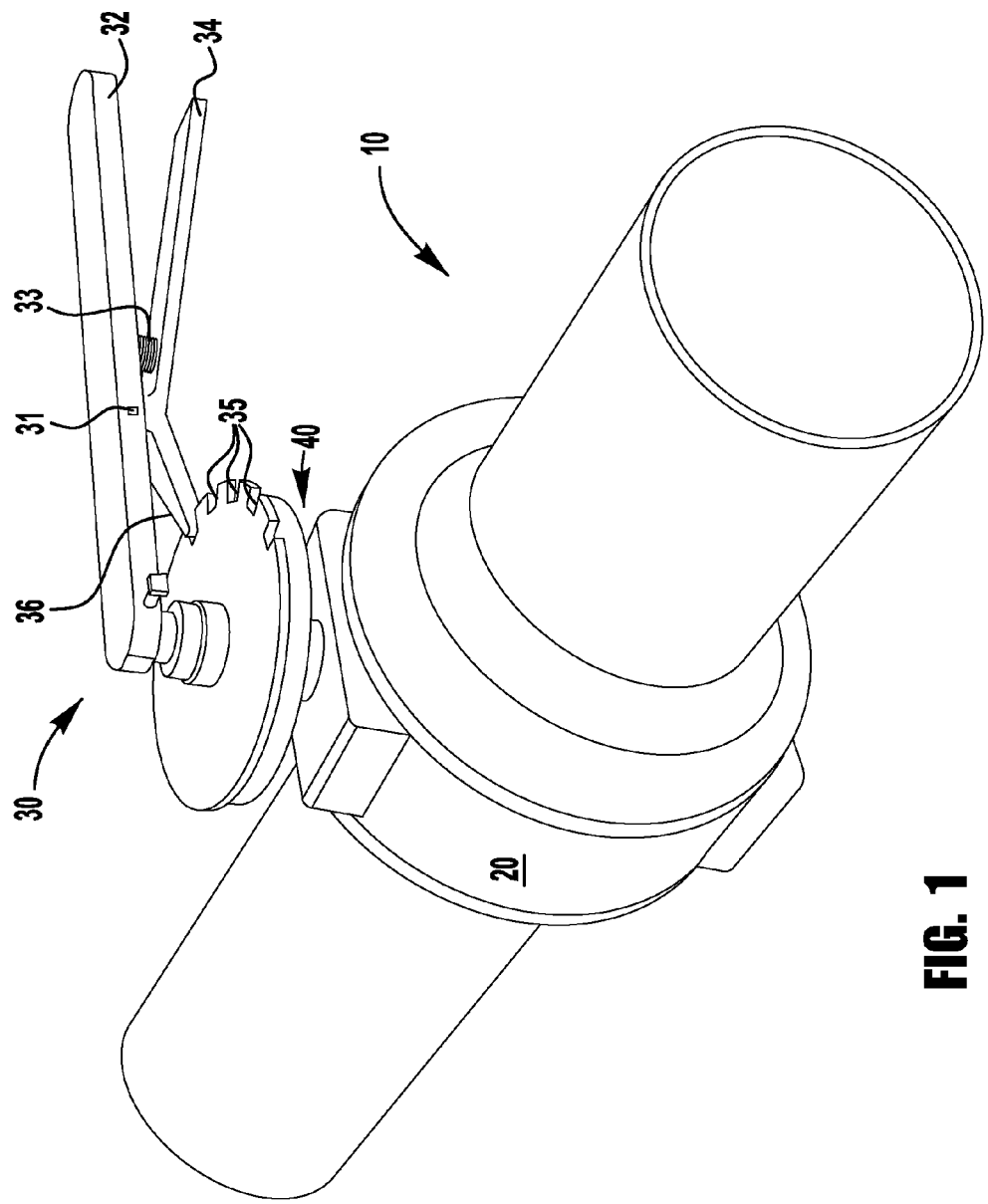
FIG. 1 is a perspective view of an exemplary valve having a handle assembly with a handle latch.

FIG. 1 illustrates an exemplary butterfly valve 10 including a valve body 20 (e.g., for installation in a fluid control system) and a handle assembly 30 assembled with the valve body for operation of a valve element (not shown), disposed within the valve body 20, between multiple flow control positions (e.g., closed, open, and one or more partially open positions of varying flow rates). The handle assembly 30 includes a user graspable handle 32 operably connected with the valve element, and a handle latch 34 pivotably assembled with the handle (at pivot pin 31) and biased (e.g., by a spring 33) into interlocking engagement with a geared handle stop 40 on the valve body 20 to secure the handle assembly 30 in a selected rotational position. When the handle latch 34 is pivoted against the biasing spring 33, an interlocking portion 36 of the handle latch 34 disengages from one or more gear teeth 35 of the geared handle stop 40, and the handle assembly 30 is rotatable to a different rotational position. When the handle latch 34 is released, the handle latch re-engages the geared handle stop 40 (e.g., at a different rotational orientation on the handle stop) to secure the handle assembly 30 at the new rotational orientation.

To prevent inadvertent or unauthorized operation of a handle assembly having a manually operable release mechanism or handle latch, as described above, a lockout device may be secured to the handle assembly to block actuation (e.g., pivoting, sliding, or other such movement) of the handle latch. While many different types of lockout devices may be utilized to block actuation of the handle latch, in one exemplary embodiment, a lockout device for a handle assembly having a handle latch includes a wedge-like or latch obstructing assembly, of any suitable shape, that can be secured between the handle and the handle latch of the handle assembly to obstruct actuation of the handle latch. In one such embodiment, a lockout device for a handle assembly includes a latch-obstructing lockout body that is cinched into secure retention between a handle and a latch by a flexible cinching member (e.g., a cable, cord, or strap) secured to the lockout device and cinched around a neck portion of the handle assembly.

Figure 2:
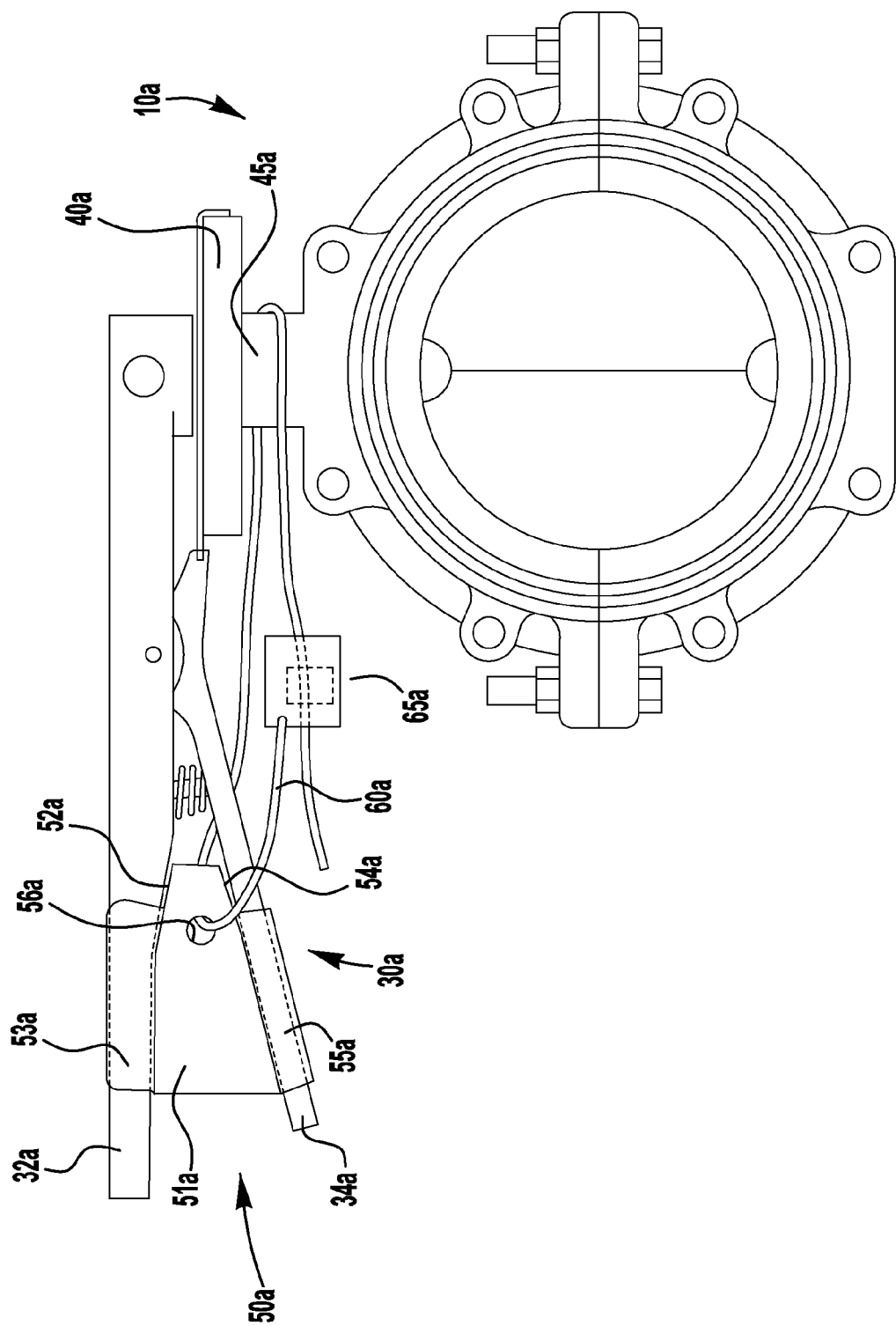
FIG. 2 is a side view of an exemplary handle lockout device assembled with an exemplary valve.

FIG. 2 illustrates a butterfly valve assembly 10a with a trigger release handle assembly 30a, as described above, with an exemplary handle lockout device 50a. The lockout device includes a lockout body 51a sized to be wedged between the handle 32a and trigger 34a of the handle assembly, with a first surface 52a engaging a lower surface of the handle 32a and a second surface 54a engaging an upper surface of the handle latch 34a. The lockout device 50a further includes pairs of side walls 53a, 55a or other suitable projections extending from the first and second surfaces 52a, 54a to receive the handle 32a and handle latch 34a therebetween, thereby preventing lateral disengagement of the lockout body 51a from the handle assembly. A cinching member 60a (e.g., cable) is secured to the lockout body 51a (e.g., through a laterally extending aperture 56a) and is cinched around a neck portion 45a below the handle stop 40a to prevent axial or longitudinal disengagement of the lockout body 51a from the handle assembly 30a. Many different suitable cinching arrangements may be utilized to secure the cinching member 60a in a cinched condition, including, for example, a "zip-tie" mechanism, adjustable cable locking mechanism, or cable lockout assembly. In the illustrated example, a lock assembly (shown schematically at 65a) is configured to lockingly engage a portion of the cinching member disposed within a lock passage or lockout aperture in the lock assembly 65a to secure the cinching member 60a in a cinched condition. The lock assembly 65a may be operable, for example, by a key or combination lock mechanism to release the cinching member 60a for loosening of the cinching member 60a and removal of the lockout device 50a. The cinching lock assembly may, but need not, include a cinching condition in which the assembly permits further tightening of the cinching member (i.e. movement of the cinching member through the lock assembly in a first direct) while preventing loosening of the cinching member (i.e., movement of the cinching member through the lock assembly in a second direction opposite the first direction). Exemplary embodiments of cable lockout devices and cable locking mechanisms are described in U.S. Pat. Nos. 6,629,440 and 6,755,054, the entire disclosures of which are incorporated herein by reference.

Figure 3:
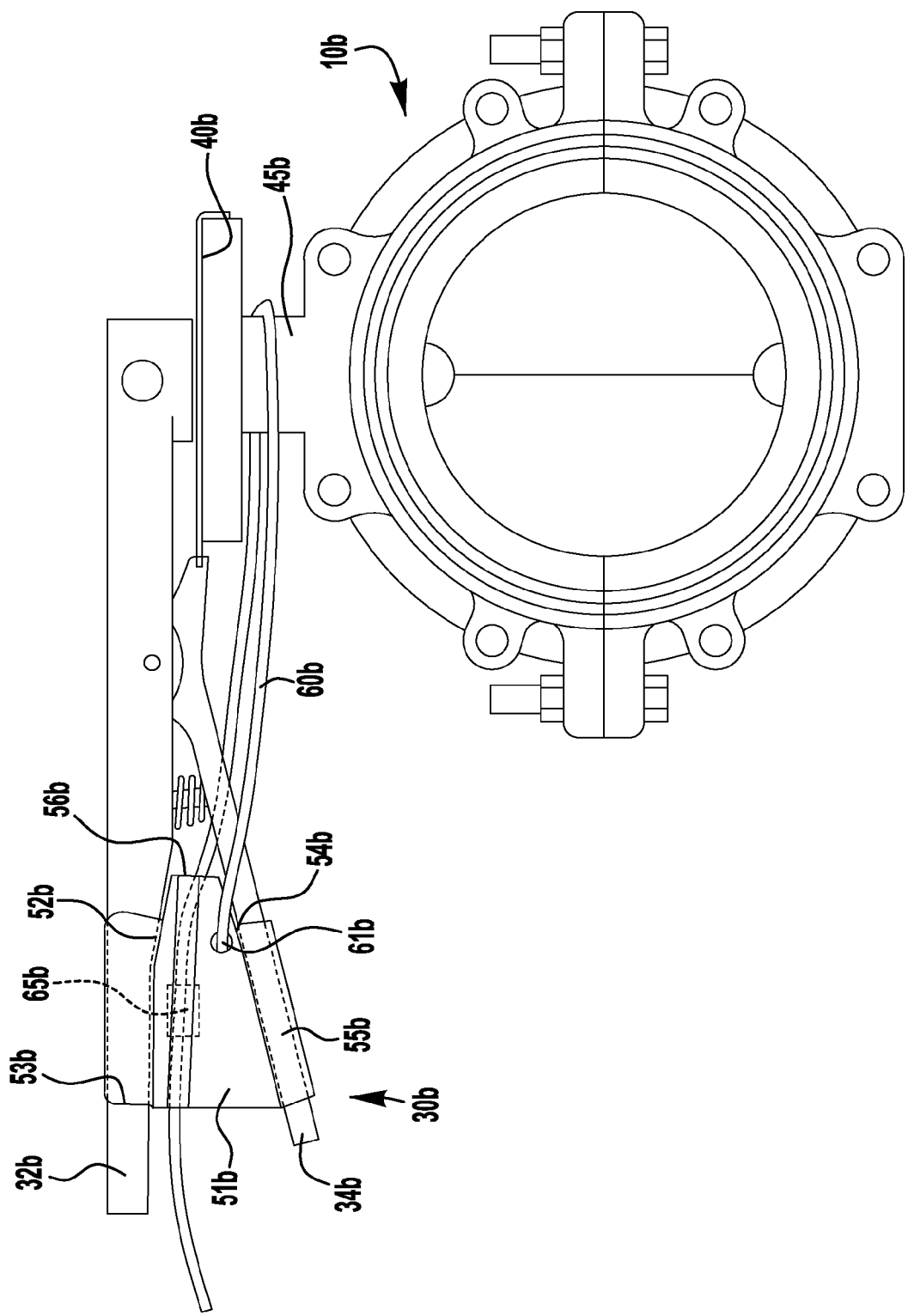
FIG. 3 is another exemplary handle lockout device assembled with an exemplary valve.

In another exemplary embodiment, a handle lockout device may be provided with a lockout body having an integral cinching arrangement for securing the lockout body between a handle and a handle latch of a handle assembly. FIG. 3 illustrates a butterfly valve assembly 10b with a latching handle assembly 30b, as described above, with an exemplary handle lockout device 50b. The lockout device includes a lockout body 51b sized to be wedged between the handle 32b and handle latch 34b of the handle assembly, with a first surface 52b engaging a lower surface of the handle 32b and a second surface 54b engaging an upper surface of the handle latch 34b. The lockout device 50b further includes side walls 53b, 55b or other suitable projections extending from the first and second surfaces 52b, 54b to receive the handle 32b and handle latch 34b therebetween, thereby preventing lateral disengagement of the lockout body 51b from the handle assembly. A cinching member 60b (e.g., cable) is anchored to the lockout body 51b at a first end 61b and extends through a locking aperture or bore 56b in the lockout body and is cinched around a neck portion 45b below the handle stop 40b to prevent axial or longitudinal disengagement of the lockout body 51b from the handle assembly 30b. The lockout body 51b includes a locking mechanism 65b configured to selectively lock or secure the portion of the cinching member 60b within the locking bore 56b to prevent loosening of the cinching member 60b. The locking mechanism 65b may be operable, for example, by a key or combination lock mechanism to release the cinching member 60b for loosening of the cinching member 60b and removal of the lockout device 50b. The locking mechanism 65b may, for example, be consistent with the cinching mechanisms described in the above incorporated U.S. Pat. Nos. 6,629,440 and 6,755,054.

A handle lockout device may utilize many different types of lockout bodies configured to be wedged or otherwise secured between a handle and a handle latch of a handle assembly. In the illustrated embodiments of FIGS. 2 and 3, the lockout bodies 51a, 51b are substantially wedge-shaped or triangular in profile, with a profile substantially matching the angled gap between the handle and the handle latch. In other embodiments, other shapes may be utilized, including, for example, lockout bodies that are circular, elliptical, rectangular, or trapezoidal in profile, or any other suitable uniform or non-uniform profile shape. In other exemplary embodiments, the lockout body may additionally or alternatively be compressible to conform to variations in the gap between the handle and handle latch. In still other exemplary embodiments, a handle lockout device may include a lockout body that is additionally or alternatively adjustable to vary the height and/or angle of the of the lockout body, for example, to accommodate a variety of handle assemblies having different sized or shaped gaps between the handle and handle latch.

Figure 4:
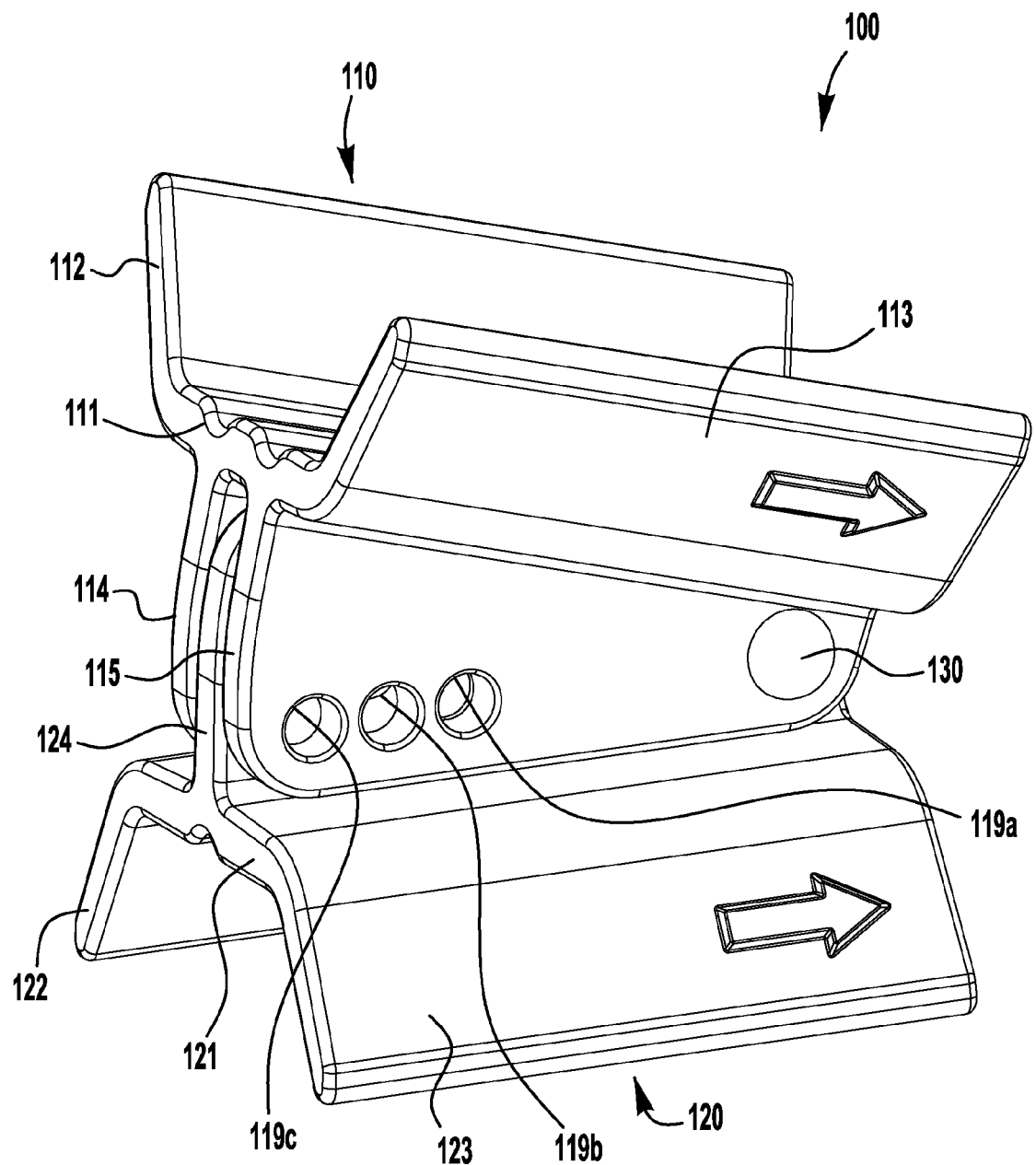
FIG. 4 is a right side perspective view of another exemplary handle lockout device.
Figure 5:
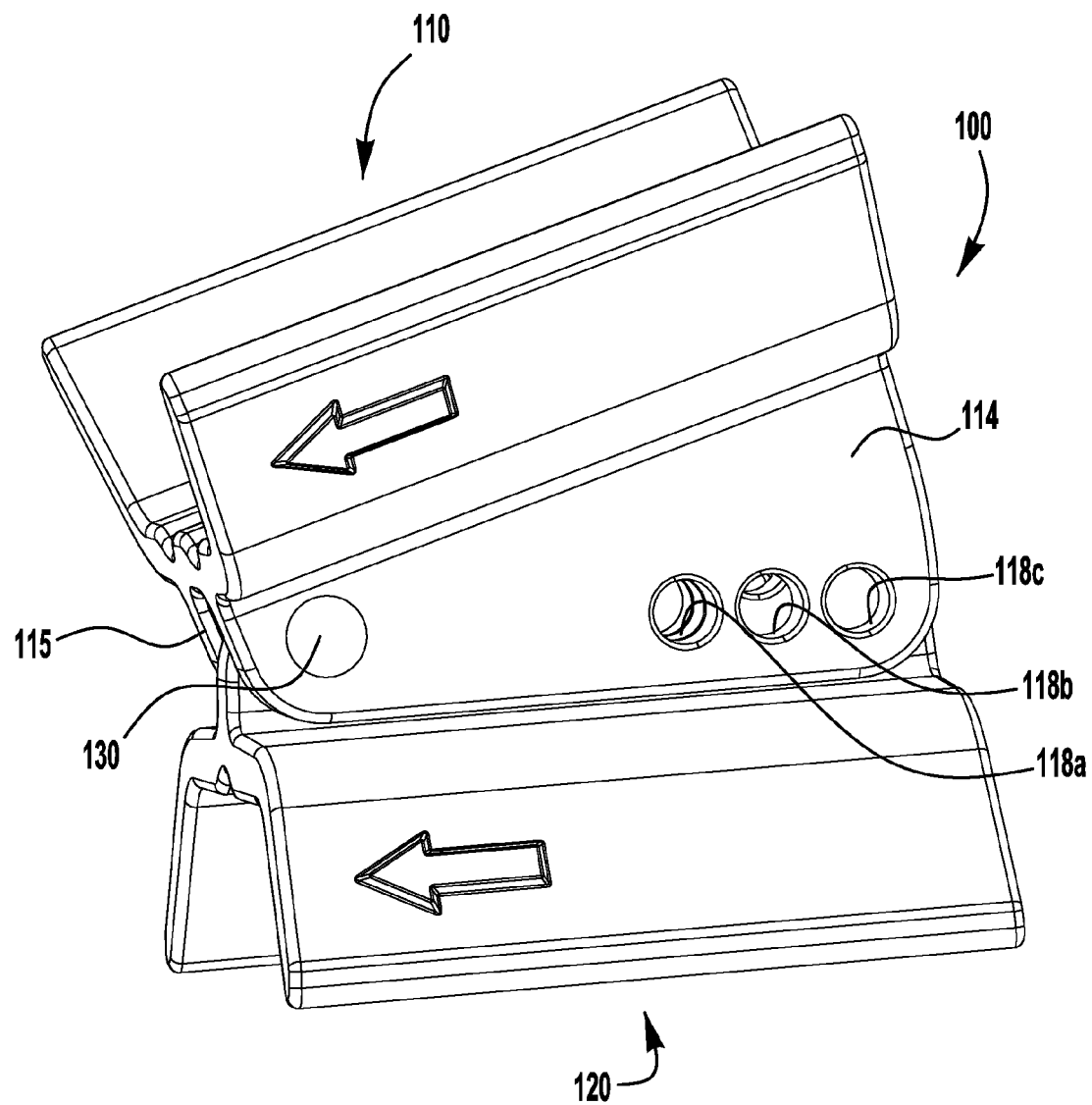
FIG. 5 is a left side perspective view of the lockout device of FIG. 4.
Figure 6:
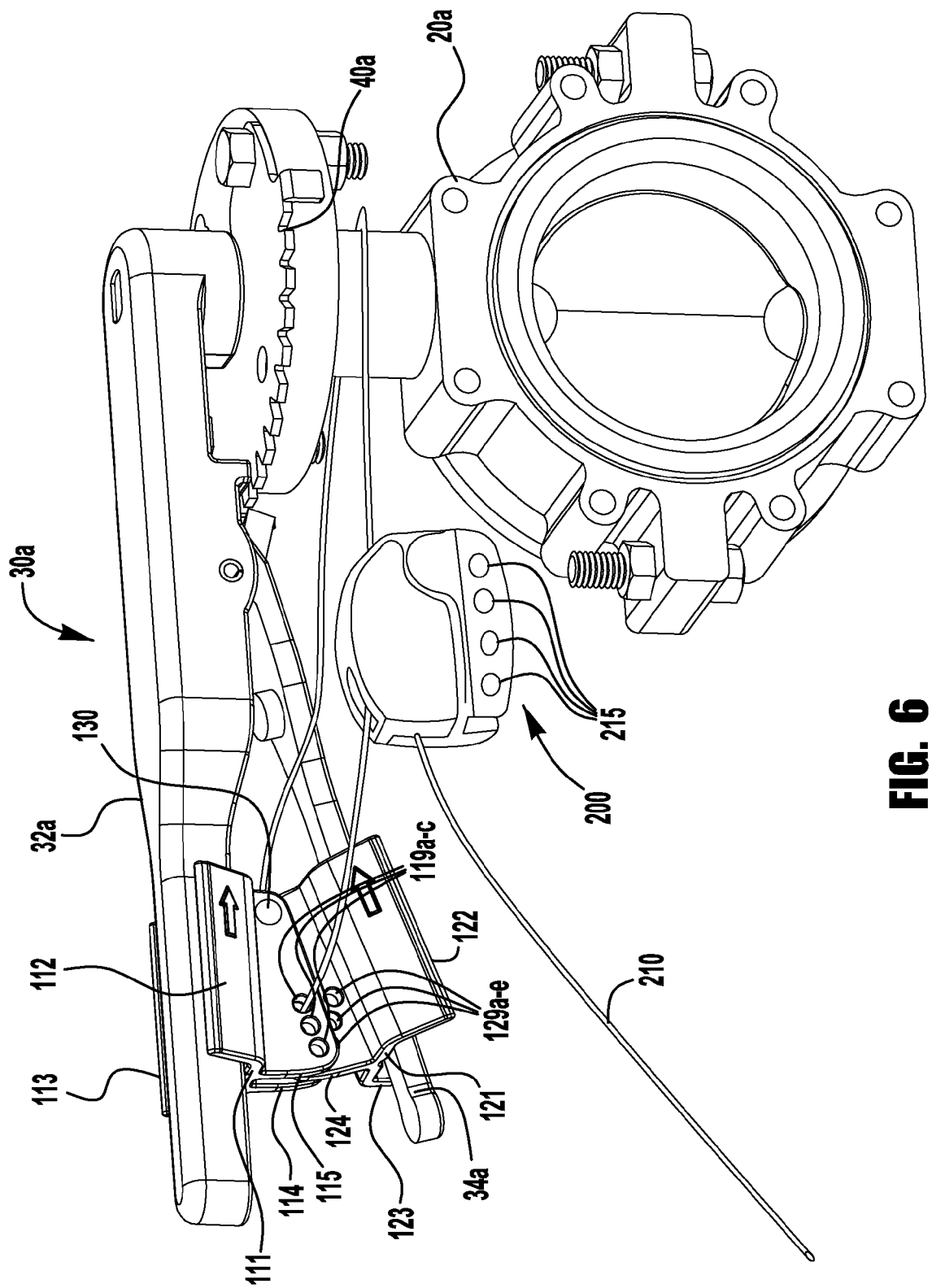
FIG. 6 is a perspective view of the lockout device of FIG. 4, shown assembled with an exemplary valve.

In an exemplary embodiment of the present application, a handle lockout device includes a lockout body formed from first and second lockout members (e.g., brackets or other structures) movable with respect to each other and securable in a range of adjustable positions to vary the size and/or shape of a handle latch obstructing lockout body of the device. FIGS. 4-6 illustrates an exemplary lockout device 100 for use, for example, with a handle assembly having a pivotable handle latch. The lockout device 100 includes first and second lockout brackets 110, 120 pivotably connected to each other at a pivot fastener 130 (e.g., a rivet), for example, to adjust the angle and height of the bracket assembly to form a close fitting wedge-shaped obstruction for a variety of handle and handle latch sizes and shapes. As shown in FIG. 6, the first lockout bracket 110 is sized to be retained on a handle 32c of a butterfly valve handle assembly 30c, with a base wall 111 engaging a bottom surface of the handle 32c and side walls 112, 113 (or other suitable projections) extending from the base wall 111 to receive the handle 32c therebetween. The second lockout bracket 120 is sized to be retained on a handle latch 34c of the butterfly valve handle assembly 30c, with a base wall 121 engaging a top surface of the handle latch 34c and side walls 122, 123 (or other suitable projections) extending from the base wall 121 to receive the handle latch 34c therebetween. The bracket side walls 112, 113, 122, 123 restrict lateral movement of the installed lockout device 100. The second lockout bracket 120 includes an upwardly extending flange 124 that is received between spaced apart downwardly extending flanges 114, 115 of the first lockout bracket 110 for guiding pivoting movement of the first and second lockout brackets 110, 120 with respect to each other.

To secure the lockout brackets 110, 120 in close fitting engagement with the handle 32c and handle latch 34c, the flanges 114, 115, 124 of the lockout brackets 110, 120 may be provided with lockout apertures 118a-c, 119a-c, 129a-e. The lockout apertures may be positioned such that at least one pair of lockout apertures 118a-c, 119a-c of the first lockout bracket 110 aligns with at least one lockout aperture 129a-e of the second lockout bracket 120 in each of multiple relative angular positions of the brackets 110, 120 to allow the lockout device 100 to be secured a range of wedge-shaped configurations for handle latch blocking obstruction of a variety of handle assemblies. Insertion of a lock member (e.g., a padlock shackle or cinched cable) through the aligned lockout apertures 118a-c, 119a-c, 129a-e secures the lockout brackets 110, 120 in the desired close fitting engagement with the handle 32c and handle latch 34c.

Figure 7:
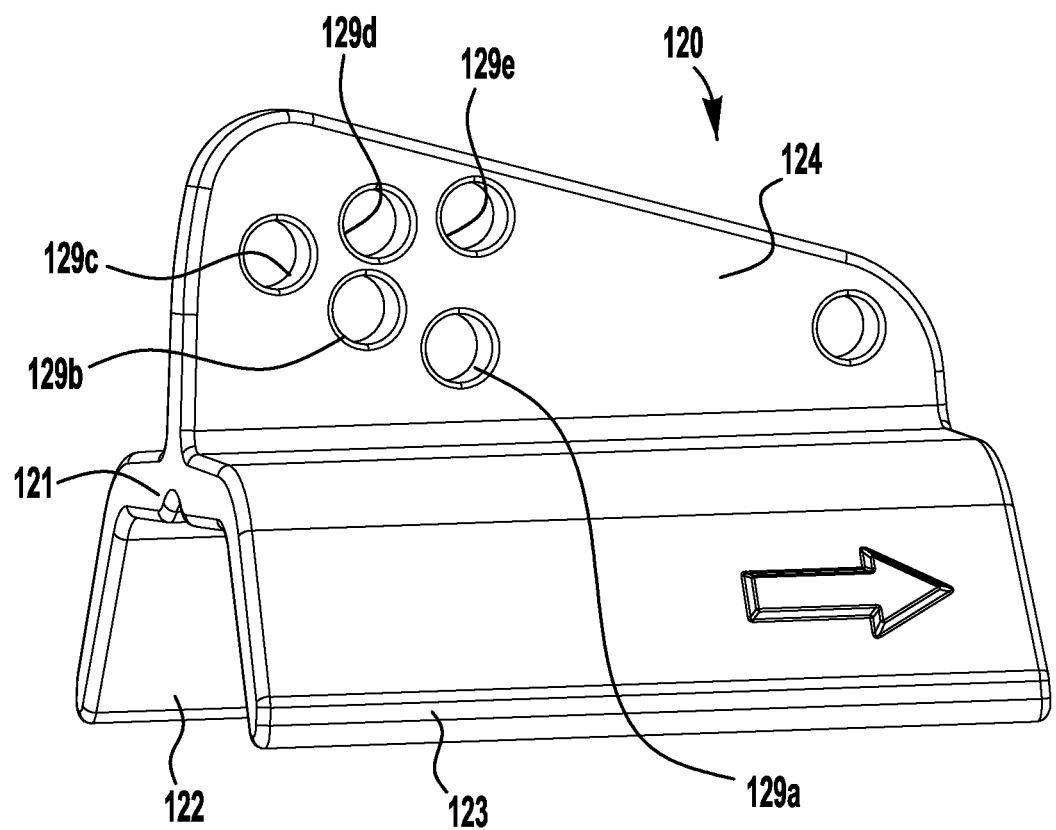
FIG. 7 is a side perspective view of a lockout bracket of the lockout device of FIG. 4.

In the illustrated embodiment, the flange 124 of the second lockout bracket 120 includes five staggered lockout apertures 129a-e, as shown in FIG. 7, that incrementally align with one of three sets of lockout apertures 118a-c, 119a-c of the flanges 114, 115 of the first lockout bracket 110 when the second lockout bracket 120 is pivoted between five incremental angular orientations with respect to the first lockout bracket. In a first, narrowest configuration, the first lockout aperture 129a of the second lockout bracket 120 aligns with the first lockout apertures 118a, 119a of the first lockout bracket 110 to receive a lock member. In a next incremental second configuration, the second lockout aperture 129b of the second lockout bracket 120 aligns with the second lockout apertures 118b, 119b of the first lockout bracket 110 to receive a lock member. In a next incremental third configuration, the third lockout apertures 129c of the second lockout bracket 120 aligns with the third lockout aperture 118c, 119c of the first lockout bracket 110 to receive a lock member. In a next incremental fourth configuration, the fourth lockout aperture 129d of the second lockout bracket 120 aligns with the second lockout apertures 118b, 119b of the first lockout bracket 110 to receive a lock member. In a next incremental fifth configuration, the fifth lockout aperture 129e of the second lockout bracket 120 aligns with the first lockout apertures 118a, 119a of the first lockout bracket 110 to receive a lock member.

A variety of configurations may be utilized to prevent removal of the lockout device 100 from the handle assembly 30c. As one example, one of the first and second lockout brackets may be lockingly secured to a corresponding one of the handle 32c and the handle latch 34c, for example, by insertion of a padlock shackle or other lock member through aligned holes in the bracket and in the handle/handle latch (not shown). As another example, at least one of the first and second lockout brackets may be lockingly secured to the valve body, for example, by a cable or other cinching member secured to the bracket or brackets (e.g., through the aligned lockout apertures 118a-c, 119a-c, 129a-e) and cinched around the valve/handle neck. While many different types of cinching lock mechanisms may be utilized to secure the lockout device in a lockout position on the valve, in one exemplary embodiment, an adjustable cable lock or cable lockout device (such as, for example, the assembles described in the above incorporated U.S. Pat. Nos. 6,629,440 and 6,755,054) is lockable (e.g., using a padlock or key cylinder lock mechanism), in a cinched condition by secure gripping engagement of the cable in this cinched condition.

In the illustrated example of FIG. 6, a cable lockout device 200 is utilized to cinch a cable locking member 210 through aligned apertures 118a-c, 119a-c, 129a-e in the lockout brackets 110, 120 and around the valve/handle neck 45c, such that the cable locking member 210 both secures the lockout device 100 against removal from the handle assembly 30c and secures the lockout brackets 110, 120 in a desired angular orientation for close fitting engagement with the handle 32c and handle latch 34c. The illustrated cable lockout device 200 is configured to maintain a secure locking grip on the cable locking member 210 when a lock member (e.g., padlock shackle, not shown) is secured through lockout apertures 215 in the device 200.

To install the exemplary lockout device 100, according to an exemplary method, the lockout device 100 is inserted between the handle 32c and the handle latch 34c of the butterfly valve handle assembly 30c, such that the handle 32c is received between the side walls 112, 113 of the first lockout bracket 110 and the handle latch 34c is received between the side walls 122, 123 of the second lockout bracket 120. The lockout brackets 110, 120 are pivoted about the pivot fastener 130, defining a pivot axis, until the base wall 111 of the first lockout bracket engages the bottom side of the handle 32a, and the base wall 121 of the second lockout bracket engages the top side of the handle latch 34a. A cable locking member 210 of a cable lockout device 200 is then inserted through aligned apertures 118a-c, 119a-c, 129a-e in the first and second lockout brackets 110, 120 (shown substantially parallel to the pivot axis) to secure the lockout brackets in the desired angular orientations, and the cable locking member 210 is wrapped around the valve body 20a and cinched in a lockout condition by the cable lockout device 200. The cable lockout device is then secured in the lockout condition by locking a padlock shackle (not shown) through aligned openings 215 in the cable lockout device 200.

In other embodiments, a lockout device for a handle assembly having a pivotable handle latch may include an integral cable locking portion or other such integral device retaining lock mechanism (e.g., integral with one of first and second lockout brackets) to secure the lockout device against removal from the handle assembly. In one such embodiment, once the lockout device is placed between the handle latch and handle, a cable may be cinched around the valve body and inserted into a cable locking portion of the lockout device. A locking mechanism (e.g., a key cylinder locking mechanism or a padlock secured through aligned apertures in the cable locking portion) may be utilized to prevent unauthorized release of the cable and removal of the lockout device.

FIGS. 8-10 illustrate an exemplary lockout device 300 for use with a handle assembly having a pivotable handle latch. The lockout device 300 includes first and second lockout brackets 310, 320 pivotably connected to each other at a pivot fastener 330 (e.g., a rivet), for example, to adjust the angle and height of the bracket assembly to form a close fitting wedge-shaped obstruction for a variety of handle and handle latch sizes and shapes. As shown in FIG. 6, the first lockout bracket 310 is sized to be retained on a handle 32*d* of a handle assembly 30*d*, with a base wall 311 engaging a bottom surface of the handle 32*d* and side walls 312, 313 (or other suitable projections) extending from the base wall 311 to receive the handle 32*d* therebetween. The second lockout bracket 320 is sized to be retained on a handle latch 34*d* of the handle assembly 30*d*, with a base wall 321 engaging a top surface of the handle latch 34*d* and side walls 322, 323 (or other suitable projections) extending from the base wall 321 to receive the handle latch 34*d* therebetween. The bracket side walls 312, 313, 322, 323 restrict lateral movement of the installed lockout device 300. The second lockout bracket 320 includes an upwardly extending flange 324 that is received between spaced apart downwardly extending flanges 314, 315 of the first lockout bracket 310 for guiding pivoting movement of the first and second lockout brackets 310, 320 with respect to each other.

As shown in FIG. 4, the first lockout bracket 310 includes a cable locking portion 350 including a housing 351 integral with and extending from the first side wall 312. The housing 351 includes a lockout aperture or passage 352 (shown extending substantially perpendicular to the pivot axis) sized to receive a first, free end 361 of a cable 360 therethrough, and a gripping mechanism (not shown, but may, for example, be similar to the cable gripping mechanisms described in the above incorporated U.S. Pat. No. 6,755,054) disposed within the housing 351 to grippingly retain an inserted portion of the cable 360, to prevent movement of the gripped cable in at least a loosening direction (and optionally, in both loosening and tightening directions). A gripping lever 355 is assembled with the housing 351 and is pivotable to move the cable gripping mechanism between gripping and releasing conditions. In the gripping condition, one or more apertures 356 in the gripping lever 355 align with one or more corresponding apertures 357 in the housing 351, such that insertion of a lock member (e.g., a padlock shackle) through aligned apertures 356, 357 prevents movement of the gripping lever 355 to release the cable 360.

A second, anchored end 362 of the cable 360 may be secured to one of the first and second lockout brackets, for example, by a fastener and/or by entrapment within or between one or both of the lockout brackets 310, 320. In the exemplary embodiment of FIGS. 8-10, as shown in FIG. 9, the cable 360 may include an enlarged knob 363 at the second end 362, that is retained in a pocket 316 between the flanges 314, 315 of the first lockout bracket 310 by the flange 324 of the second lockout bracket 320 when the second lockout bracket is assembled with the first lockout bracket. In another exemplary embodiment, as shown in FIGS. 11 and 12, an enlarged knob 363*a* at a second end 362*a* of a cable 360*a* may be captured in a molded pocket 316*a* in the second side wall 313*a* of the first lockout bracket 310*a*. As shown, the pocket 316*a* may extend to an opening 317*a* in the second side wall 313*a*, such that when the free end 361*a* is released from the passage 352*a* in the cable locking portion 350*a*, the knob 363*a* may be withdrawn from the pocket 316*a* for removal of the cable 360*a* from the lockout device 300*a* (for example, to replace a damaged cable or to replace a cable with a cable of a different length or material).

To install the exemplary lockout devices 300, 300*a*, according to an exemplary method, the lockout device 300, 300*a* is inserted between the handle 32*d* and the handle latch 34*d* of the handle assembly 30*d*, such that the handle 32*d* is received between the side walls 312, 313, 312*a*, 313*a* of the first lockout bracket 310, 310*a* and the handle latch 34*d* is received between the side walls 322, 323, 322*a*, 323*a* of the second lockout bracket 320, 320*a*. The free end 361, 361*a* of the cable 360, 360*a* is wrapped around the valve body/handle neck, inserted through the passage 352, 352*a* of the cable locking portion housing 351, 351*a*, and pulled to cinch the cable 360, 360*a* around the neck. The gripping lever 355, 355*a* is pivoted to the locking position, and a lock member (e.g., padlock shackle, not shown) is inserted through aligned apertures 356, 357, 356*a*, 357*a* in the gripping lever 355, 355*a* and housing 351, 351*a* to secure the cable 360, 360*a* against loosening, thereby securing the lockout device 300, 300*a* on the handle assembly 30*d*.

In the illustrated embodiments, the first and second brackets 310, 320, 310*a*, 320*a* are freely pivotable about the pivot fastener 330, 330*a* to allow the device 300, 300*a* to assume a desired angular shape or orientation when the device is assembled with a handle assembly 30*d* and cinched around the valve. In other exemplary embodiments, the first and second lockout brackets of a lockout device with integral cable locking portion may include apertures that align to receive a lock member therethrough (not shown, but may, for example, be similar to the exemplary lockout device 100 of FIGS. 4-6), thereby securing the lockout brackets against further angular adjustments. In one such exemplary embodiment, the cable of the integral cable locking portion may be inserted through the aligned lockout bracket apertures to secure the angular orientation of the brackets, before inserting the cable through the passage in the cable locking portion. In still other exemplary embodiments, the first and second lockout brackets of a lockout device with integral cable locking portion may be angularly fixed with respect to each other (e.g., fixedly assembled or integral to each other) to form a suitably shaped wedge for insertion between the handle and handle latch of a handle assembly.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

We claim:

1. A lockout device for a handle assembly including a handle and a handle latch assembled with the handle and movable toward the handle to release the handle assembly for rotational movement, the lockout device comprising:
    first and second lockout members each including an outward facing base wall and first and second projections extending outward from the corresponding base wall, wherein the first and second projections of the first base member are spaced apart to receive the handle therebetween, and the first and second projections of the second base member are spaced apart to receive the handle latch therebetween, the first and second lockout members being pivotable with respect to each other to a lockout position for engagement of the base walls of the first and second lockout members with facing surfaces of the handle and the handle latch when the first and second lock members are installed between the handle and the handle latch;
    wherein when the first and second lockout members are secured between the handle and the handle latch in the lockout position, the first and second lockout members block movement of the handle latch to prevent rotational movement of the handle assembly.

2. The lockout device of claim 1, further comprising at least one lockout aperture disposed in at least one of the first and second lockout members, for receiving a cinching member configured to be tightened around the handle assembly to secure the first and second lockout members between the handle and the handle latch in the lockout position.

3. The lockout device of claim 2, wherein the at least one lockout aperture comprises a first lockout aperture in the first lockout member and a second lockout aperture in the second lockout member, the first and second lockout apertures aligning to receive a locking member when the first and second lockout members are in the lockout position, such that a locking member inserted through the aligned lockout apertures prevents pivoting movement of the first and second lockout members out of engagement with the facing surfaces.

4. The lockout device of claim 2, wherein the at least one lockout aperture comprises a first set of one or more lockout apertures in the first lockout member and a second set of one or more lockout apertures in the second lockout member, wherein one of the first set of lockout apertures aligns with one of the second set of lockout apertures in each of at least first and second lockout positions of the first and second lockout members, such that a locking member inserted through the aligned lockout apertures prevents pivoting movement of the first and second lockout members out of a selected one of the at least first and second lockout positions.

5. The lockout device of claim 1, further comprising a cinching member for securing the first and second lockout members between the handle and the handle latch in the lockout position.

6. The lockout device of claim 5, wherein the cinching member comprises a cable including a first end secured to at least one of the first and second lockout members and a second end receivable through the at least one lockout aperture.

7. The lockout device of claim 6, wherein the at least one lockout aperture comprises a passage disposed in one of the first and second lockout members, the one of the first and second lockout members further comprising a locking mechanism configured to lockingly engage a portion of the cinching member disposed in the passage.

8. The lockout device of claim 7, wherein the locking mechanism is operable by a lever assembled with the one of the first and second lockout members, and movable between a locking position and an unlocking position.

9. The lockout device of claim 8, wherein the lever includes a lock opening that aligns with a corresponding lock opening in the one of the first and second lockout members when the lever is in the locking position, such that insertion of a lock member through the aligned lock openings prevents movement of the lever to the unlocking position.

10. The lockout device of claim 1, wherein the first and second lockout members comprise first and second brackets, with a flange portion of the first bracket pivotally connected with a flange portion of the second bracket.

11. The lockout device of claim 10, wherein the at least one lockout aperture comprises a plurality of apertures disposed in the flange portions of the first and second lockout brackets.

12. A method of securing a handle assembly in a latched condition, the handle assembly including a handle and a handle latch assembled with the handle and movable toward the handle to release the handle assembly for rotational movement, the method comprising:
    inserting a lockout body between opposed facing surfaces of the handle and the handle latch, such that the facing surface of the handle is received between first and second projections of the lockout body to engage a first surface of the lockout body, and the facing surface of the handle latch is received between third and fourth projections of the lockout body to engage a second surface of the lockout body, wherein the first, second, third, and fourth projections prevent lateral disengagement of the lockout body from the handle assembly;
    securing a cinching member to the lockout body;
    tightening the cinching member around the handle assembly to prevent longitudinal disengagement of the lockout body from the handle assembly; and
    pivoting a first lockout member of the lockout body with respect to a second lockout member of the lockout body to orient the first and second surfaces of the lockout body in a lockout position corresponding with the facing surfaces of the handle and the handle latch.

13. The method of claim 12, further comprising securing a locking member through aligned lockout apertures in the first and second lockout members to secure the first and second surfaces in the lockout position.

14. The method of claim 13, wherein securing the cinching member to the lockout body comprises inserting the cinching member through the aligned lockout apertures, wherein the locking member comprises a portion of the cinching member.

15. The method of claim 12, wherein securing the cinching member to the lockout body comprises inserting the cinching member through a lock passage in a locking mechanism and operating the locking mechanism to lockingly engage a portion of the cinching member disposed in the lock passage.

16. The method of claim 15, wherein the lock passage and locking mechanism are disposed in the lockout body.

17. The method of claim 15, wherein the lock passage and locking mechanism are disposed in a lock assembly separate from the lockout body.

18. In combination, an instrument having a latching handle assembly including a handle and a handle latch assembled with the handle and movable toward the handle from a handle latching position to a handle releasing position, and a lockout device securing the handle latch in the handle latching position, the lockout device comprising:

a lockout body inserted between opposed facing surfaces of the handle and the handle latch, such that the facing surface of the handle is received between first and second projections of the lockout body and in engagement with a first surface of the lockout body, and the facing surface of the handle latch is received between third and fourth projections of the lockout body and in engagement with a second surface of the lockout body, such that the first, second, third, and fourth projections prevent lateral disengagement of the lockout body from the handle assembly; and a cinching member secured to the lockout body and tightened around the handle assembly to prevent longitudinal disengagement of the lockout body from the handle assembly;

wherein the lockout body comprises a first lockout member defining the first surface and a second lockout member defining the second surface, wherein the first lockout member is pivotable with respect to the second lockout member to orient the first and second surfaces of the lockout body in a lockout position corresponding with the facing surfaces of the handle and the handle latch.

* * * * *